(12) United States Patent
Yamaguchi

(10) Patent No.: US 6,497,616 B2
(45) Date of Patent: Dec. 24, 2002

(54) AIR CONDITIONER OUTLET VENT DEVICE

(75) Inventor: Takayuki Yamaguchi, Gunma (JP)

(73) Assignee: Moriroku Kabushiki Kaisha, Tokyo (JP)

(*) Notice: Subject to any disclaimer, the term of this patent is extended or adjusted under 35 U.S.C. 154(b) by 0 days.

(21) Appl. No.: 09/938,526

(22) Filed: Aug. 27, 2001

(65) Prior Publication Data

US 2002/0025774 A1 Feb. 28, 2002

(30) Foreign Application Priority Data

Aug. 30, 2000 (JP) .................................. 2000-265989

(51) Int. Cl.⁷ ................................................. B60H 1/34
(52) U.S. Cl. ......................................... 454/155; 454/315
(58) Field of Search ................................. 454/155, 202, 454/315

(56) References Cited

U.S. PATENT DOCUMENTS 5,364,303 A * 11/1994 Terry ........................ 454/155
5,393,262 A * 2/1995 Hashimoto et al. ......... 454/155
5,599,230 A * 2/1997 Naruse et al. .............. 454/155

FOREIGN PATENT DOCUMENTS

JP 6-41851 11/1994

* cited by examiner

Primary Examiner—Harold Joyce
(74) Attorney, Agent, or Firm—Arent Fox Kintner Plotkin & Kahn, PLLC

(57) ABSTRACT

In an air conditioner outlet vent device in which a plurality of second blades are arranged behind a plurality of first blades in a direction perpendicular to the direction in which the first blades are arranged. The second blades are linked to a common link member, supported in a housing in a pivotable manner, and can be pivoted by an operating knob that can slide in the direction in which the second blades are arranged. A cut out recess opening toward the first blades and a pair of covers covering opposite sides of the cut out recess are provided on one of the second blades, and an engaging arm provided on the operating knob is inserted into the cut out recess so that the engaging arm can engage with one of the two covers. It is possible thereby to increase the amount of air blown out, and to enhance the air directing performance by making the gaps between the second blades relatively small.

3 Claims, 7 Drawing Sheets

AIR CONDITIONER OUTLET VENT DEVICE

BACKGROUND OF THE INVENTION

1. Field of the Invention

The present invention relates to an air conditioner outlet vent device that is suitable for use in an automobile, etc. and, in particular, to an improvement in an air conditioner outlet vent device comprising a plurality of first blades and a plurality of second blades that are arranged behind the first blades in a direction perpendicular to the direction in which the first blades are arranged, the second blades being connected to a common link member and supported in a housing in a pivotable manner so that the second blades can be pivoted by an operating knob that can slide in the direction in which the second blades are arranged.

2. Description of the Related Art

Conventionally, such an air conditioner outlet vent device is already known as in, for example, Japanese Utility Model Registration Publication No. 6-41851, in which a rack formed on an operating knob slidably guided by a first blade is meshed with a fan-shaped pinion provided on one of a plurality of second blades.

However, in the above-mentioned conventional device, in order to make relatively large the degree to which the plurality of second blades can pivot, that is to say, the range over which the directions of the air blown out are controlled by the second blades, it is necessary to set the length of the rack and the extent to which the fan-shaped pinion projects out of the opposite sides of the second blade at relatively large levels. The area in the cross section of the outlet vent that is occupied by the rack and the pinion therefore becomes relatively large, leading to a decrease in the amount of air blown out through the outlet vent.

Although it is known that the smaller the gap between the blades, the better the air directing performance, in the above-mentioned conventional device, since it is necessary to prevent the pinion provided integrally with one of the second blades from interfering with the second blades present on opposite sides of the pinion, it is difficult to set the gaps between the second blades at a small level.

SUMMARY OF THE INVENTION

The present invention has been carried out in view of the above mentioned circumstances, and it is an object of the present invention to provide an air conditioner outlet vent device that can increase the amount of air blown out, and improve the air directing performance by making the gaps between the second blades relatively small.

In order to achieve the above-mentioned object, in accordance with a first characteristic of the present invention, there is proposed an air conditioner outlet vent device comprising: a housing forming an outlet vent; a plurality of first blades arranged parallel to each other within the outlet vent; a plurality of second blades arranged within the outlet vent behind the first blades in a direction perpendicular to the direction in which the first blades are arranged, linked to a common link member and supported in the housing in a pivotable manner around axes parallel to each other; and an operating knob placed on the first blades side in a such manner that it can slide in the direction in which the second blades are arranged, and connected to one of the plurality of second blades so as to pivot the one second blade; wherein a cut out recess opening toward the first blades and a pair of covers covering opposite sides of the cut out recess are provided on the one second blade, and an engaging arm provided on the operating knob is inserted into the cut out recess so that the engaging arm can engage with one of the two covers.

In accordance with the above-mentioned arrangement of the first characteristic, when the operating knob slides in the direction in which the second blades are arranged, the engaging arm inserted into the cut out recess provided on one of the second blades engages with one of the pair of covers which are provided on the one second blade so as to block opposite sides of the cut out recess, thus pivoting the one second blade. As a result, the other second blades that are linked to the one second blade via the common link member also pivot. Moreover, since the amount by which the pair of covers blocking opposite sides of the cut out recess project out of opposite sides of the second blade is smaller than that of a conventional fan-shaped pinion, it is possible to make the area in the cross section of the outlet vent that is occupied by the engaging and linking parts of the operating knob and the second blade relatively small, thus increasing the amount of air blown out. Furthermore, it is also possible to enhance the air directing performance by making the gaps between the second blades relatively small. Moreover, when the second blades are pivoted in either the right or left direction, since opposite sides of the cut out recess are covered with the covers, the amount of air passing through the cut out recess can be minimized, thus suppressing as much as possible degradation of the air directing performance due to air passing through the cut out recess.

Furthermore, in accordance with a second characteristic of the present invention, in addition to the above-mentioned first characteristic, there is proposed an air conditioner outlet vent device wherein at least one part of the housing is molded by primary injection using a first synthetic resin so as to have shaft holes into which shafts provided integrally with each of the second blades are fitted, and the second blades are molded by secondary injection within this part of the housing using a second synthetic resin having a melting point lower than that of the first synthetic resin. In accordance with the above-mentioned arrangement, at the time when the two stage injection molding of this part of the housing and the second blades is completed, the second blades are supported in this part of the housing, thus reducing the number of parts and the number of assembly steps.

The above-mentioned objects, other objects, characteristics and advantages of the present invention will become apparent from explanations of preferred embodiments that will be described in detail below by reference to the attached drawings

BRIEF DESCRIPTION OF THE DRAWINGS

FIG. 1 is a perspective view of an air conditioner outlet vent device.

FIG. 2 is an exploded perspective view of the air conditioner outlet vent device.

FIG. 3 is a cross section at line 3—3 in FIG. 1.

FIG. 4 is a cross section at line 4—4 in FIG. 3 in which the second blades are in a stationary state.

FIG. 5 is a cross section corresponding to FIG. 4 in which the second blades are in a pivoted state.

FIG. 6 is a perspective view of an air conditioner outlet vent device.

FIG. 7 is a cross section at line 7—7 in FIG. 6.

DESCRIPTION OF PREFERRED EMBODIMENTS

The first embodiment of the present invention is explained by reference to FIGS. 1 to 5. Firstly, in FIGS. 1 to 3, a housing 11A of the air conditioner outlet vent device is formed by joining a front housing 12A made of a synthetic resin in the form of a rectangular cylinder to a rear housing 13 made of a synthetic resin in the form of a rectangular cylinder, and has an outlet vent 14 having a rectangular cross section.

The housing 11A is mounted in, for example, an instrument panel of a passenger vehicle in a manner such that it can be pivoted in the vertical direction in such a manner that the open rear end of the housing 11A is connected to an air supply duct of an air conditioner.

Figure 1:
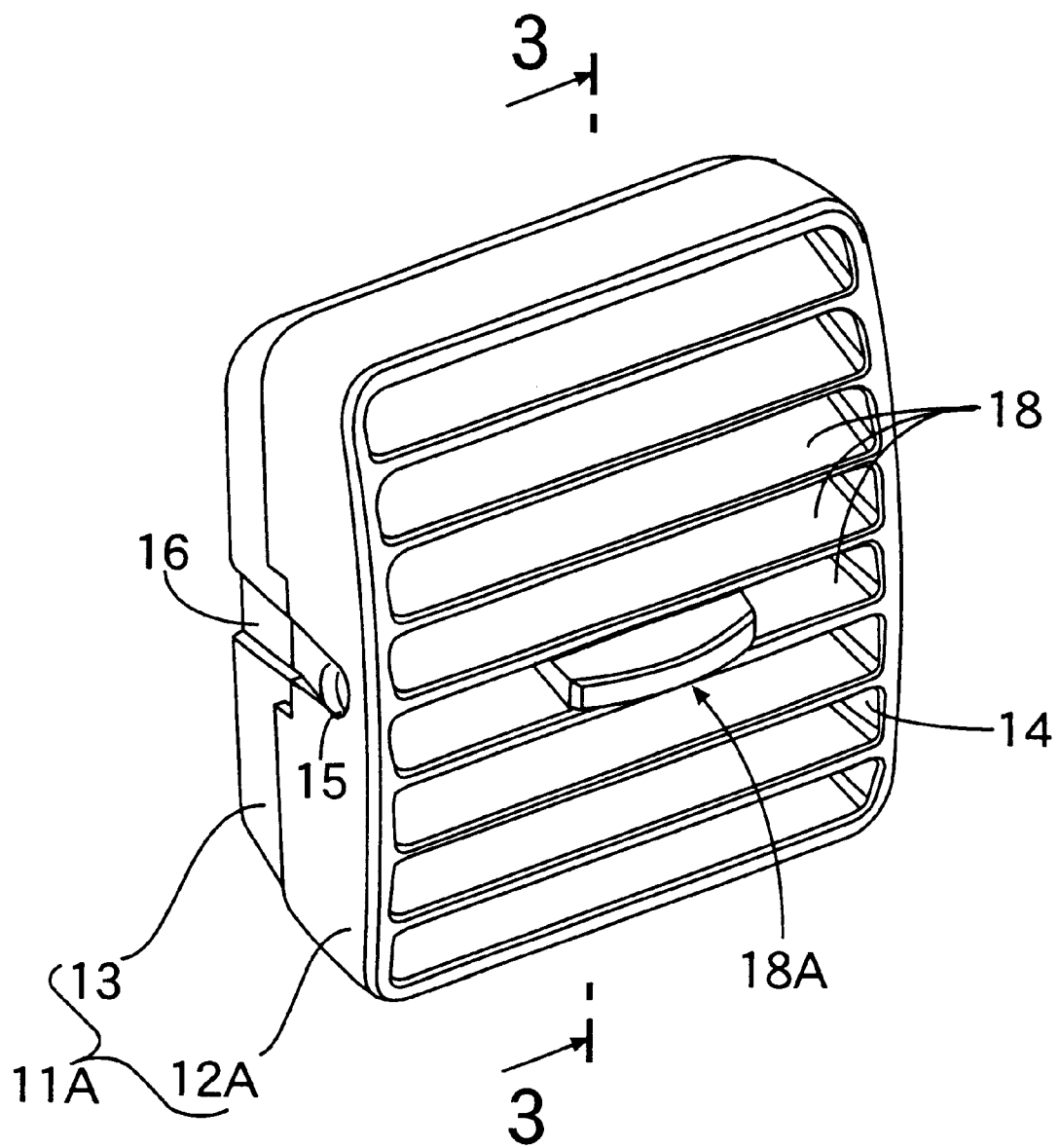
FIGS. 1 to 5 illustrate a first embodiment of the present invention.
Figure 2:
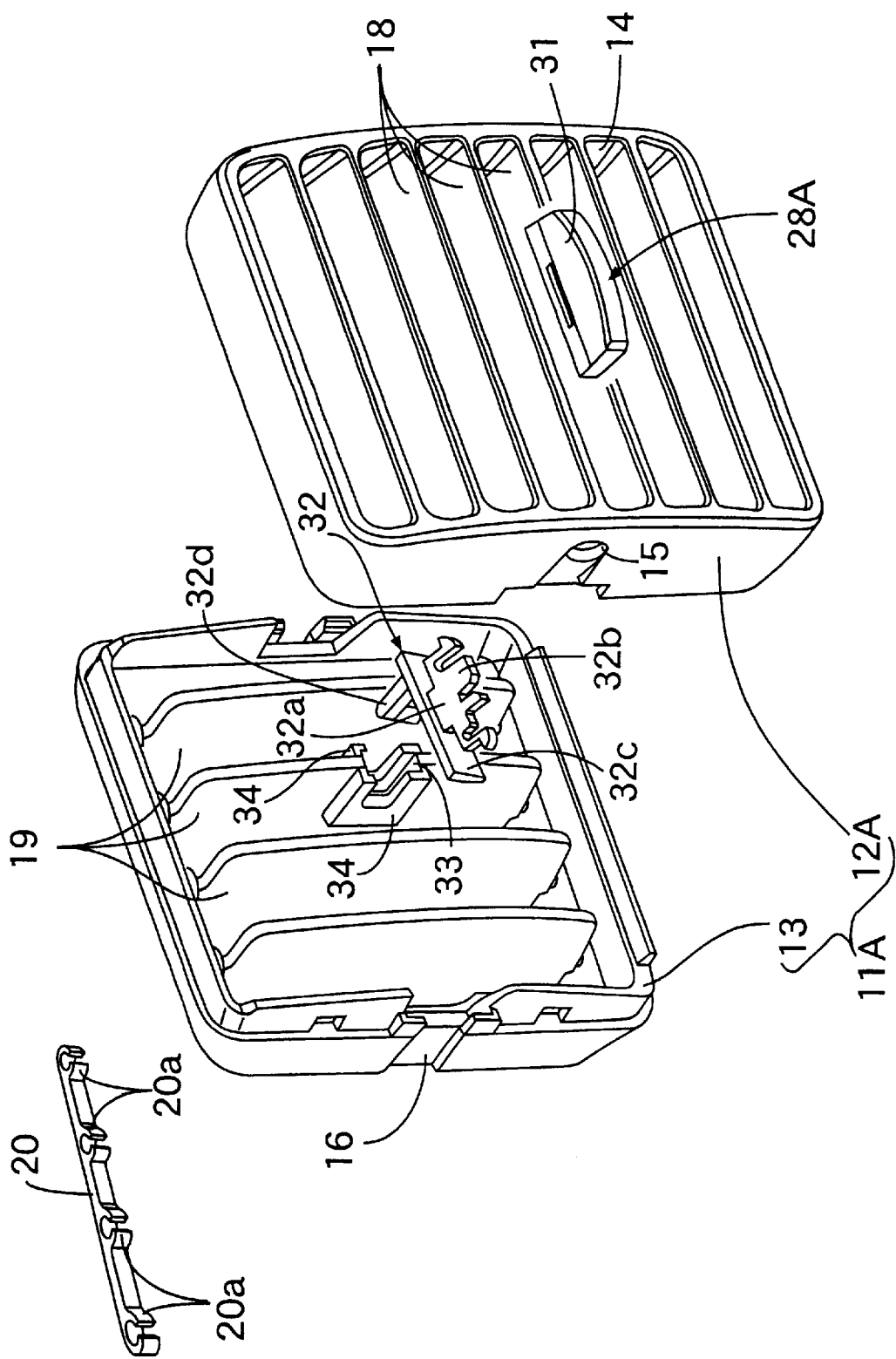
Figure 3:
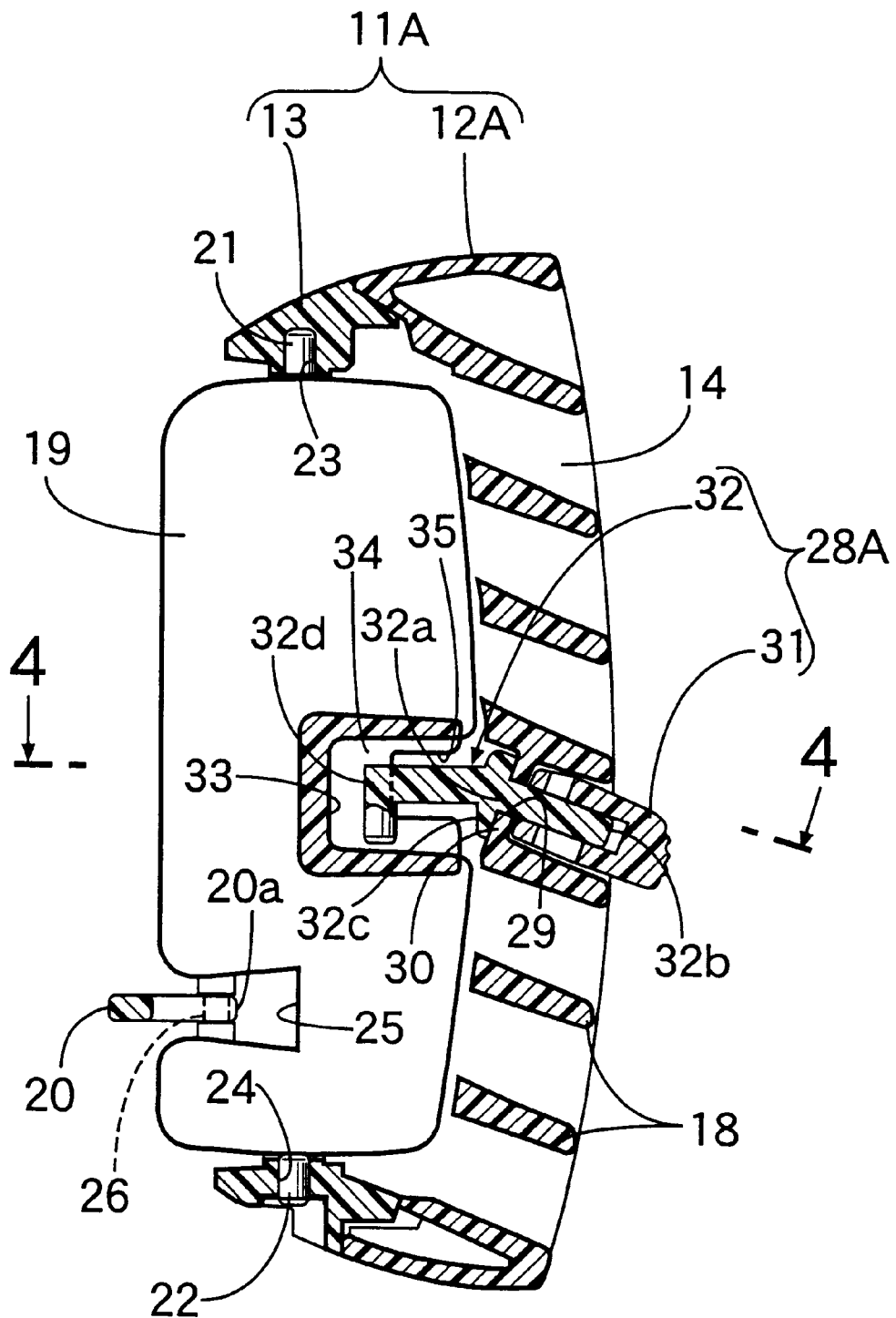
Figure 4:
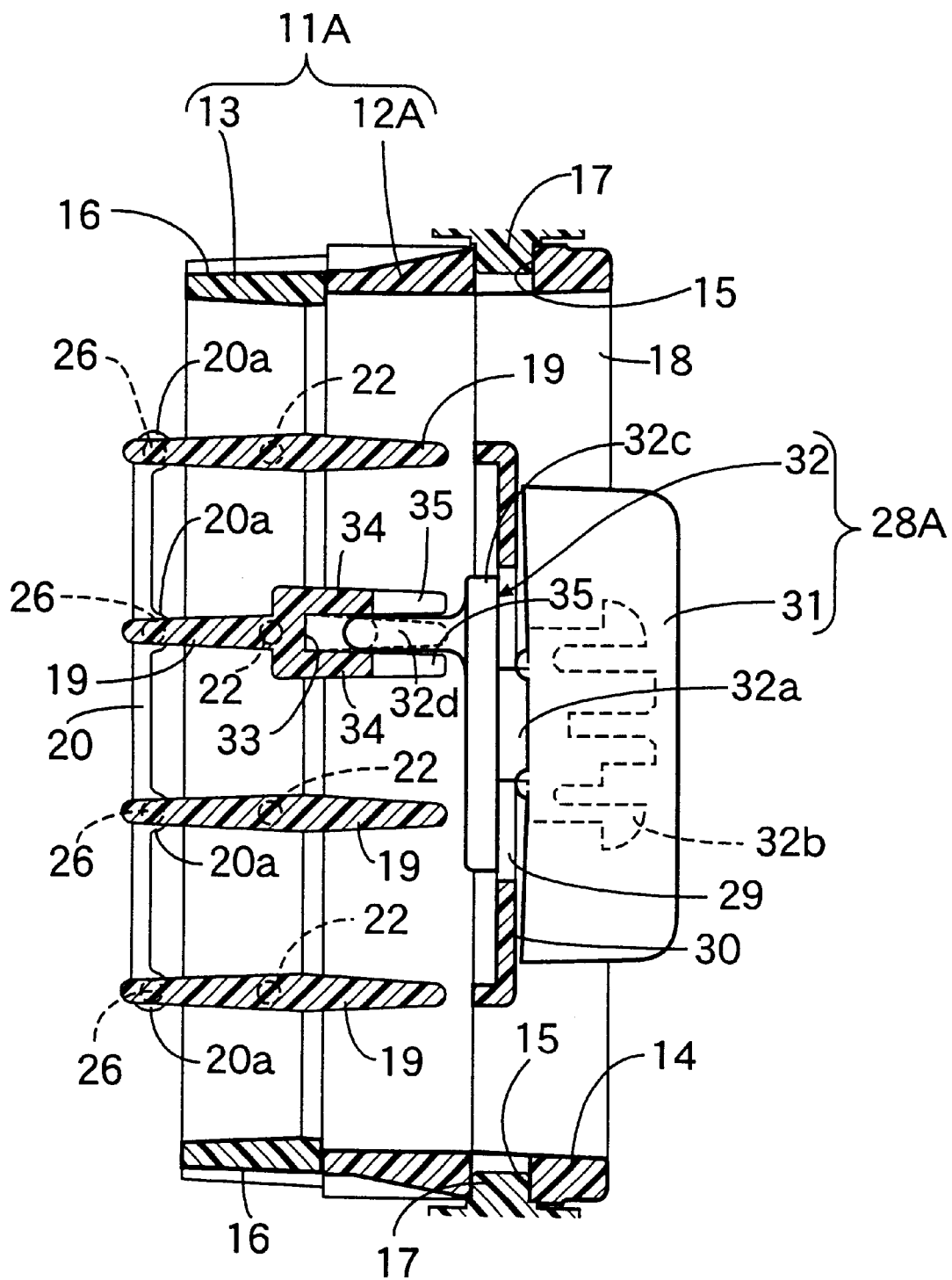

Referring also to FIG. 4, support holes 15 are coaxially provided on opposite sides of the front housing 12A. Grooves 16 whose forward ends are connected to the support holes 15 are provided on the opposite sides of the front housing 12A and the rear housing 13 in such a manner that the rear ends of the grooves 16 are open. Each of the grooves 16 is formed so that the depth thereof at the forward end decreases as it approaches the corresponding support hole 15. Support shafts 17 are provided in the instrument panel. By pushing the housing 11A backward in a state in which the support shafts 17 are fitted into the rear ends of the corresponding grooves 16, the support shafts 17 travel over shallow sections of the grooves 16 and fit into the support holes 15. The housing 11A is thereby mounted in the instrument panel in a manner such that it can be pivoted in the vertical direction. Moreover, the position of the housing 11A that has pivoted in the vertical direction can be maintained by the frictional force between the support shafts 17 and the front housing 12A.

A plurality of first blades 18 extending in the lateral direction are formed integrally with the front housing 12A so that the first blades 18 are arranged in the vertical direction in the outlet vent 14. The direction of air oriented by the first blades 18 is determined by the position of the housing 11A, that is to say, the front housing 12A that has pivoted in the vertical direction.

A plurality of second blades 19 are provided in the outlet vent 14 behind the first blades 18, and longitudinally arranged in a direction perpendicular to the direction in which the first blades 18 are arranged. These second blades 19 are supported in the rear housing 13 so that they can pivot around their respective axes that are parallel to each other. Each of the second blades 19 is linked to a common link member 20.

A pair of coaxial shafts 21 and 22 are provided integrally on the upper and lower ends of each of the second blades 19. The shafts 21 on the upper ends of the second blades 19 are fitted into the corresponding bottomed shaft holes 23 provided in the upper wall of the rear housing 13. The shafts 22 on the lower ends of the second blades 19 are fitted into the corresponding shaft holes 24 provided in the lower wall of the rear housing 13. The second blades 19 are thus supported in the rear housing 13, that is to say, in the housing 11A in a pivotable manner.

Of the housing 11A, at least the rear housing 13 is made of a first synthetic resin such as, for example, an ABS resin. On the other hand, the second blades 19 are made of a second synthetic resin that has a melting point lower than that of the first synthetic resin and is, for example, a polypropylene resin. The shafts 21 and 22 that are to be fitted into the shaft holes 23 and 24 provided in the rear housing 13 which is molded by primary injection using the first synthetic resin, are provided integrally with the second blades 19, which are molded by secondary injection within the rear housing 13 using the second synthetic resin having a melting point lower than that of the first synthetic resin.

That is to say, the rear housing 13 and the second blades 19 are molded by a two-stage injection molding method. Since the synthetic resin used for forming the second blades 19 has a melting point lower than that of the synthetic resin used for forming the rear housing 13, sections of the second blades 19 and the rear housing 13 that are in contact with each other are not melt-bonded. Rather, the shafts 21 and 22 of each of the second blades 19 become detached from the inner faces of the shaft holes 23 and 24 of the rear housing 13 due to thermal shrinkage after the secondary injection molding, and the outer surfaces of the shafts 21 and 22 are in moderate frictional contact with the inner faces of the shaft holes 23 and 24.

Recesses 25 that open to the rear are formed in a lower rear part of each of the second blades 19. Link shafts 26 are provided in each of the second blades 19 so as to run across each of the recesses 25 vertically. The link member 20 has approximately C-shaped fittings 20a that are fitted resiliently around the link shafts 26 of the second blades 19 from the rear. Each of the second blades 19 is connected in common to the link member 20 by engaging the fittings 20a with the corresponding link shafts 26.

The second blades 19 are operated so as to pivot by an operating knob 28A that can slide in the direction in which the second blades 19 are arranged, that is to say, in the lateral direction. A guide wall 30 having a guide hole 29 that is elongated in the longitudinal direction of the first blades 18, that is to say, in the lateral direction, is provided between a pair of vertically adjoining first blades 18 approximately in the middle of the housing 11A in the vertical direction in order to guide the operating knob 28A while it slides.

The operating knob 28A is formed by a front knob 31 positioned forward relative to the guide wall 30 and a rear knob 32 connected to the front knob 31. The rear knob 32 integrally comprises a neck 32a running slidably through the guide hole 29, an engagement part 32b that is provided so as to be connected to the forward end of the neck 32a and is inserted into and engaged with the front knob 31, a clamping plate 32c that is provided so as to be connected to the rear end of the neck 32a so that the guide wall 30 is interposed between the clamping plate 32c and the front knob 31 which is engaged with and connected to the engagement part 32b, and an approximately L-shaped engaging arm 32d projecting out of the clamping plate 32c toward the second blades 19.

A cut out recess 33 opening toward the first blades 18 is provided on one of the second blades 19a placed approximately centrally with respect to the direction in which the second blades 19a are arranged. Moreover, a pair of covers 34 covering opposite sides of the cut out recess 33 are provided integrally on this second blade 19a. The engaging arm 32d of the operating knob 28A is inserted into the cut out recess 33 so that the rear end of the engaging arm 32d can engage with one of the two covers 34. Notches 35 are formed on both the covers 34 so as to receive a middle section of the engaging arm 32d.

The action of this first embodiment is now explained. The second blades 19 that are placed in the outlet vent 14 behind the first blades 18 and arranged in a direction perpendicular to the direction in which the first blades 18 are arranged are supported in the housing 11A in a pivotable manner around axes that are parallel to each other and are connected to the common link member 20. The engagement arm 32d provided on the operating knob 28A which is placed on the first blades 18 side in such a manner that it can slide in the direction in which the second blades 19 are arranged, that is to say, in the lateral direction, is inserted into the cut out recess 33 provided in one of the second blades 19. The one second blade 19 has the integral covers 34 covering opposite sides of the cut out recess 33 so that the engaging arm 32d engages with one of the covers 34.

Figure 5:
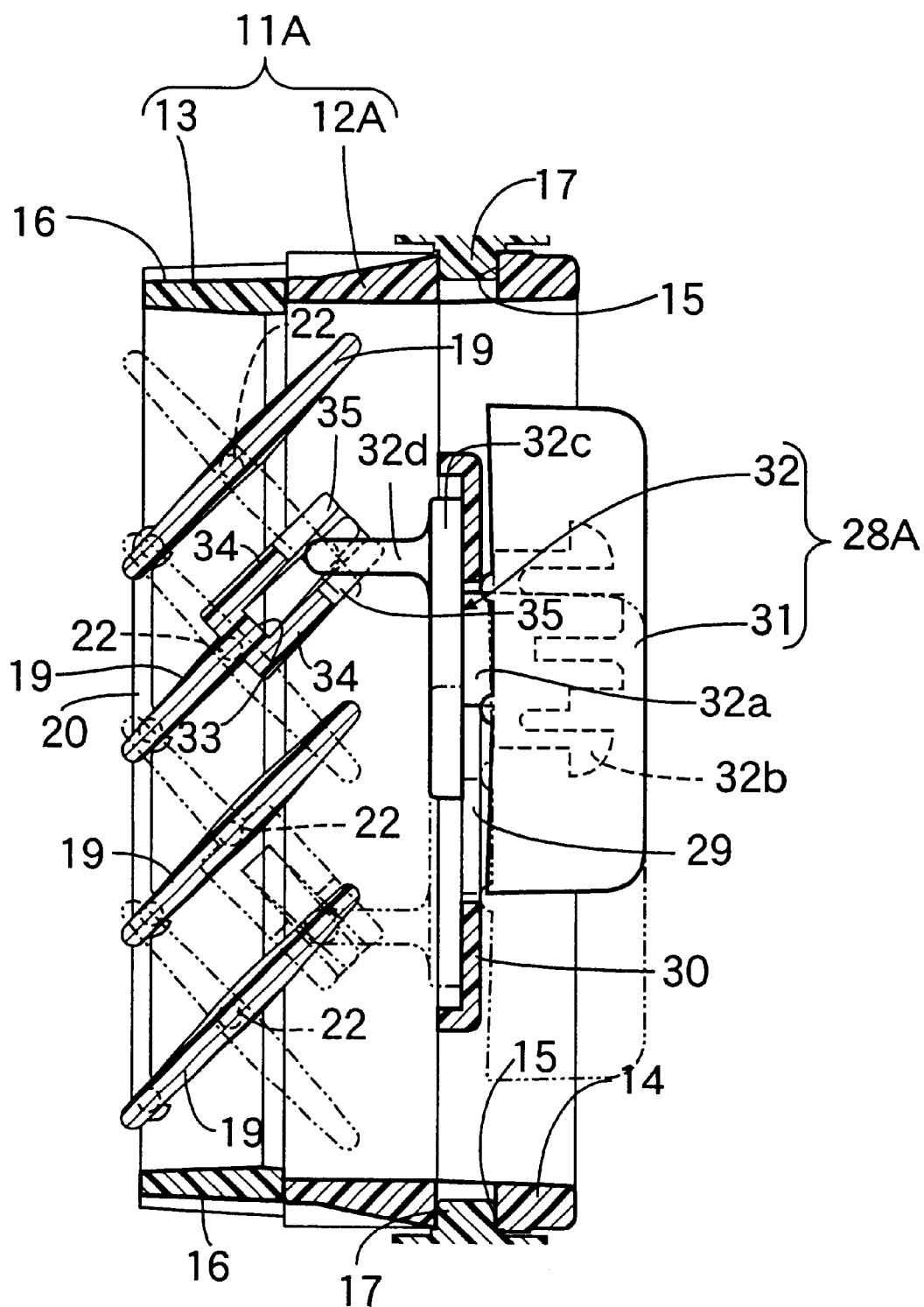

When the operating knob 28A slides in the direction in which the second blades 19 are arranged as shown in FIG. 5, the engaging arm 32d inserted into the cut out recess 33 therefore engages with one of the pair of covers 34 which block opposite sides of the cut out recess 33, thereby pivoting the one second blade 19. As a result, the other second blades 19 that are linked to the one second blade 19 via the common link member 20 also pivot.

Since the amount by which the pair of covers 34 blocking opposite sides of the cut out recess 33 project out of opposite sides of the second blade 19 is smaller than in conventional devices having a fan-shaped pinion on a second blade, it is possible to make the area in the cross section of the outlet vent 14 that is occupied by the engaging and linking parts of the operating knob 28A and the second blade 19 relatively small, thus increasing the amount of air blown out. It is also possible to enhance the air directing performance by making the gaps between the second blades 19 relatively small.

When the second blades 19 are pivoted in either the right or left direction as shown in FIG. 5, since opposite sides of the cut out recess 33 are covered with the covers 34, the amount of air passing through the cut out recess 33 can be minimized, thus suppressing as much as possible degradation of the air directing performance due to air passing through the cut out recess 33.

Moreover, at least the rear housing 13 of the housing 11A is molded by primary injection using a first synthetic resin, and the shafts 21 and 22 fitted into the shaft holes 23 and 24 provided in the rear housing 13 are integral with the second blades 19 which are molded by secondary injection within the rear housing 13 using a second synthetic resin having a melting point lower than that of the first synthetic resin. At the time when the two stage injection molding of the rear housing 13 and the second blades 19 is completed, the second blades 19 are therefore supported in the rear housing 13, thus reducing the number of parts and the number of assembly steps.

Figure 6:
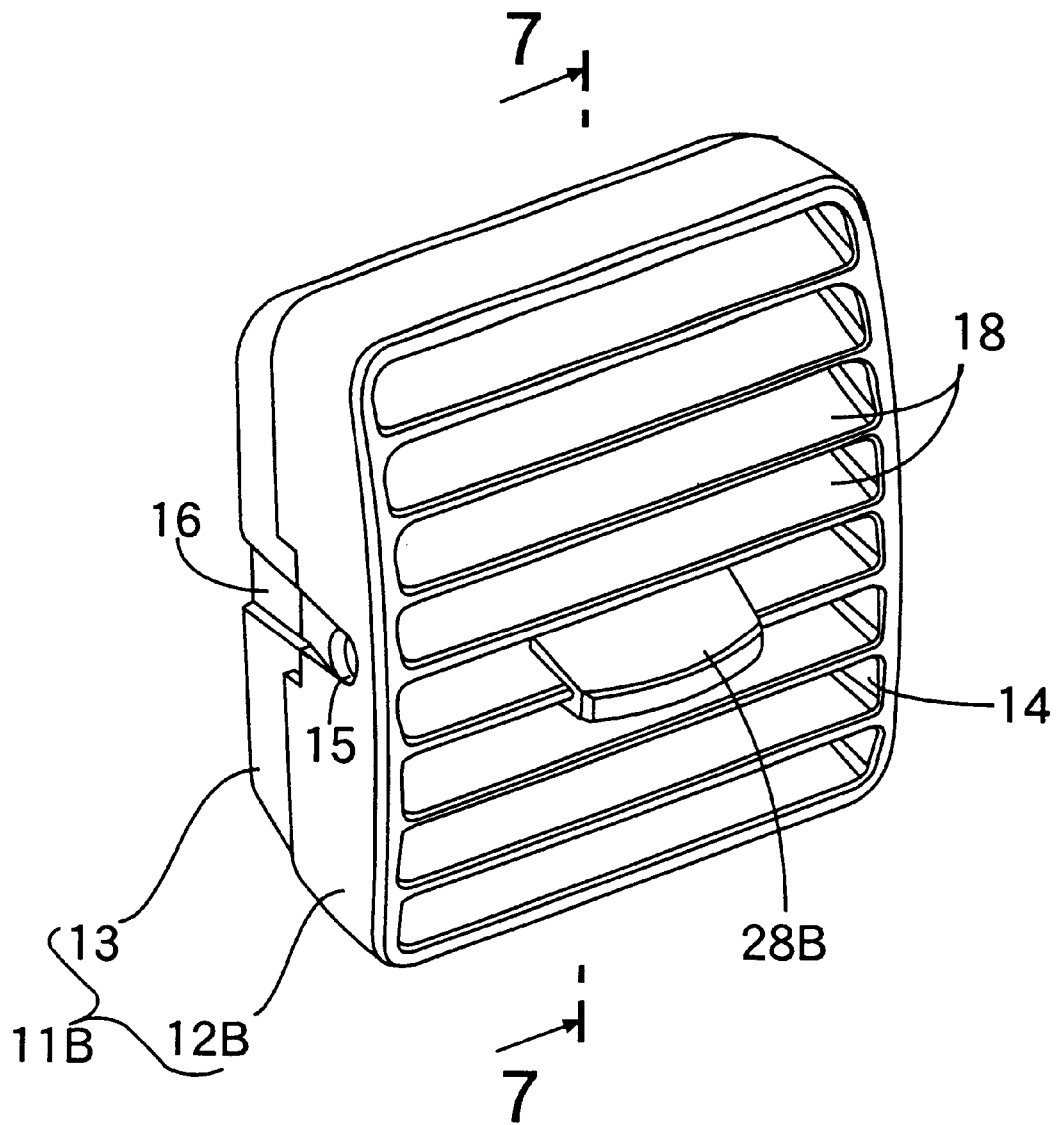
FIGS. 6 and 7 illustrate a second embodiment of the present invention.
Figure 7:
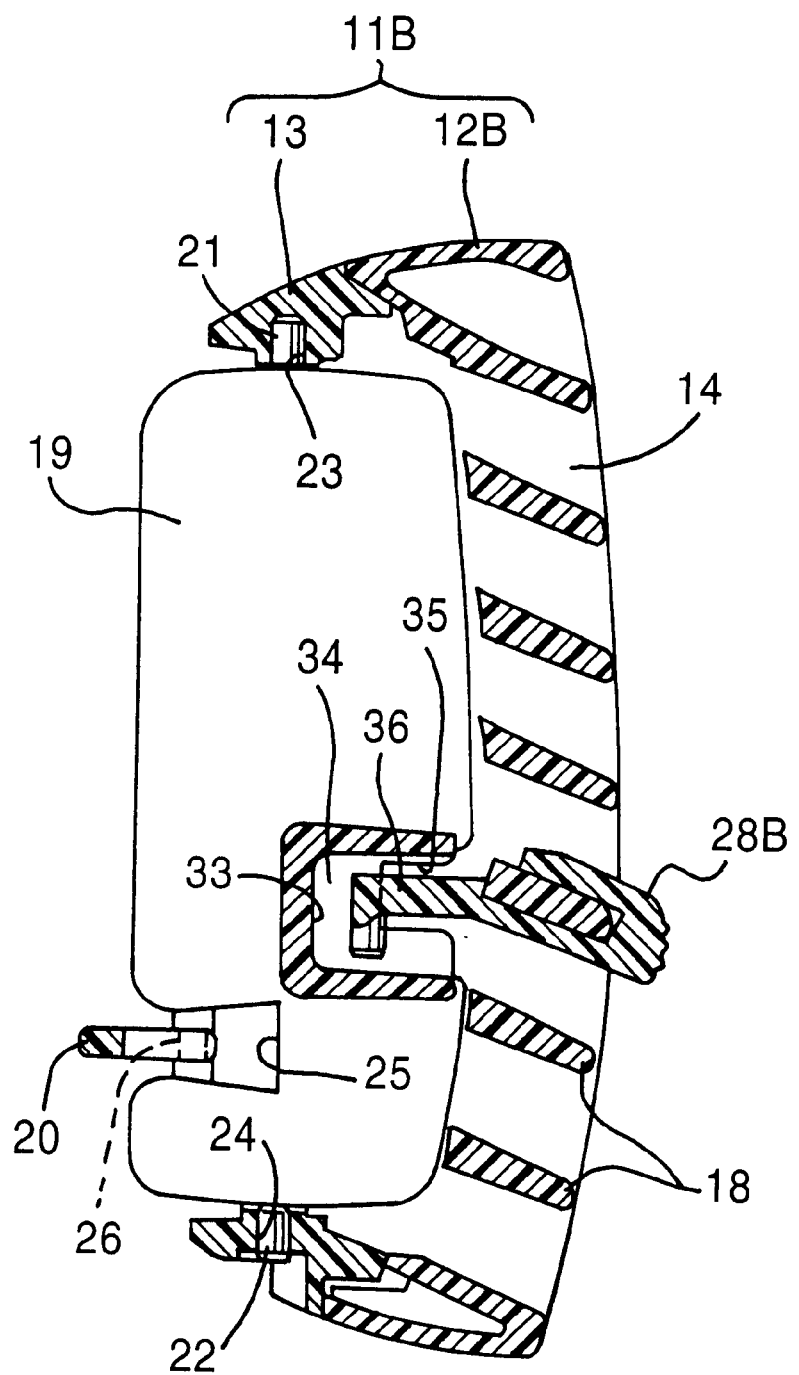

The second embodiment is now explained by reference to FIGS. 6 and 7, and the parts corresponding to the first embodiment are denoted using the same reference numerals in FIGS. 6 and 7.

A housing 11B of the air conditioner outlet vent device is formed by joining a front housing 12B made of a synthetic resin in the form of a rectangular cylinder to a rear housing 13 made of a synthetic resin in the form of a rectangular cylinder, and has an outlet vent 14 having a rectangular cross section.

A plurality of first blades 18 extending in the lateral direction are formed integrally with the front housing 12B so that the first blades 18 are arranged in the vertical direction in the outlet vent 14. A plurality of second blades 19 arranged in the lateral direction in the outlet vent 14 behind the first blades 18 are supported in the rear housing 13, and are each linked to a common link member 20.

The second blades 19 are operated so as to pivot by an operating knob 28B that can slide in the direction in which the second blades 19 are arranged, that is to say, in the lateral direction. The operating knob 28B is mated with and attached to a first blade 18 that is positioned approximately centrally with respect to the vertical direction in which the plurality of first blades 18 are arranged, whereby the operating knob 28B can slide in the direction in which the second blades 19 are arranged.

An approximately L-shaped engaging arm 36 projecting toward the second blades 19 is formed integrally with the operating knob 28B. The engaging arm 36 is inserted into a cut out recess 33 provided in one of the second blades 19 so that the engaging arm 36 can engage with one of a pair of covers 34 provided on the one second blade 19 so as to cover opposite sides of the cut out recess 33.

The second embodiment can give the same effect as that obtained by the first embodiment.

In the above-mentioned embodiments, the housing 11A or 11B is formed by joining the front housing 12A or 12B to the rear housing 13, but the entire housing may be molded integrally. In this case, the second blades 19 may be molded by secondary injection within the entire housing which is molded by primary injection.

Although embodiments of the present invention have been explained above, the present invention is not limited by the above-mentioned embodiments and can be modified in a variety of ways without departing from the spirit and scope of the present invention described in the claims.

What is claimed is:

1. An air conditioner outlet vent device comprising:

a housing forming an outlet vent;

a plurality of first blades fixedly arranged on the housing in a first direction and parallel to each other within the outlet vent;

a plurality of second blades arranged within the outlet vent behind the first blades in a second direction perpendicular to the first direction in which the first blades are arranged, each of the second blades are operatively linked to each other by a common link member and are supported in the housing in a pivotable manner around axes parallel to each other;

an operating knob placed around one of the plurality of first blades in such a manner that the operating knob is slidable in the second direction and is connected to one of the plurality of second blades so as to pivot the one second blade;

a cut out recess having an opening that faces toward the first blades; and a pair of covers covering opposite sides of the cut out recess, the cut out recess is provided on a front edge of the one second blade, wherein the operating knob includes an engaging arm that is parallel to the second direction, the engaging arm is inserted and slidable within the cut out recess so that the engaging arm can engage one of the covers and pivot the plurality of second blades.

2. An air conditioner outlet vent device according to claim 1 wherein at least one part of the housing is molded by primary injection using a first synthetic resin so as to have shaft holes into which shafts provided integrally with each of the second blades are fitted, and the second blades are molded by secondary injection within this part of the housing using a second synthetic resin having a melting point lower than that of the first synthetic resin.

3. The air conditioner outlet vent device according to claim 1, wherein said device is for use with a stationary structure and said housing is for mounting on said stationary structure so as to be pivotable around an axis extending in the first direction.

* * * * *